(12) United States Patent  
Tamura

(10) Patent No.: US 8,554,829 B2  
(45) Date of Patent: Oct. 8, 2013

(54) VIRTUAL SERVER ID MANAGING SYSTEM, INTEGRATED MONITORING SYSTEM, VIRTUAL SERVER ID MANAGING PROGRAM, AND INTEGRATED MONITORING PROGRAM

(75) Inventor: Mineyuki Tamura, Tokyo (JP)

(73) Assignee: Hitachi Systems, Ltd., Tokyo (JP)

( * ) Notice: Subject to any disclaimer, the term of this patent is extended or adjusted under 35 U.S.C. 154(b) by 115 days.

(21) Appl. No.: 13/173,358

(22) Filed: Jun. 30, 2011

(65) Prior Publication Data

US 2012/0254284 A1   Oct. 4, 2012

(30) Foreign Application Priority Data

Mar. 29, 2011  (JP) .................................. 2011-072328

(51) Int. Cl.
*G06F 15/16* (2006.01)
(52) U.S. Cl.
USPC ........................... 709/202; 709/201; 709/224
(58) Field of Classification Search
USPC ........................................ 709/201, 202, 224
See application file for complete search history.

(56) References Cited

U.S. PATENT DOCUMENTS

| | | | | |
|---|---|---|---|---|
| 7,870,191 B2 * | 1/2011 | Hatasaki et al. | ............... | 709/203 |
| 7,890,613 B2 * | 2/2011 | Tameshige et al. | ........... | 709/220 |
| 8,103,721 B2 * | 1/2012 | Hatasaki et al. | ............... | 709/203 |
| 8,171,119 B2 * | 5/2012 | Tameshige et al. | ........... | 709/220 |
| 2007/0276897 A1 * | 11/2007 | Tameshige et al. | ........... | 709/201 |
| 2009/0113124 A1 * | 4/2009 | Kataoka et al. | ................ | 711/112 |
| 2009/0287799 A1 * | 11/2009 | Tameshige et al. | ........... | 709/220 |
| 2010/0332661 A1 | 12/2010 | Tameshige | | |
| 2011/0113127 A1 * | 5/2011 | Tameshige et al. | ........... | 709/220 |

FOREIGN PATENT DOCUMENTS

| | | |
|---|---|---|
| JP | 2006-72784 | 3/2006 |
| JP | 2010-271863 | 12/2010 |
| JP | 2011-8481 | 1/2011 |
| WO | WO 2008/126145 | 10/2008 |

OTHER PUBLICATIONS

Office Action issued in Japanese Patent Application No. 2011-072328 on Apr. 9, 2013.
Translation of Non-Patent Literature Document filed Jun. 30, 2011 titled Amazon Elastic Cloud (Amazon EC2), publication date Aug. 25, 2006.

* cited by examiner

*Primary Examiner* — Brian P Whipple
(74) *Attorney, Agent, or Firm* — Antonelli, Terry, Stout & Kraus, LLP.

(57) ABSTRACT

In a system including an integrated monitoring system and its monitoring target system, a technology capable of achieving detailed monitoring for a plurality of virtual servers or others by appropriately identifying the plurality of virtual servers, managing their ID information, and others is provided. The present system includes an ID managing function of performing ID management for a monitor processing for each of a plurality of virtual servers (server instances) in the monitoring target system. The ID managing function performs a processing of providing a uniquely-identifiable ID (instance ID) to each of the plurality of server instances and identifies each of the server instances by referencing the ID at the monitor processing.

6 Claims, 7 Drawing Sheets

VIRTUAL SERVER ID MANAGING SYSTEM, INTEGRATED MONITORING SYSTEM, VIRTUAL SERVER ID MANAGING PROGRAM, AND INTEGRATED MONITORING PROGRAM

CROSS-REFERENCE TO RELATED APPLICATION

The present application claims priority from Japanese Patent Application No. 2011-72328 filed on Mar. 29, 2011, the content of which is hereby incorporated by reference into this application.

TECHNICAL FIELD OF THE INVENTION

The present invention relates to technologies for the Internet, cloud computing, virtual servers (server instances), monitoring, and others.

BACKGROUND OF THE INVENTION

[Cloud Computing System]

In a cloud computing system, a server virtualizing technology (a technology of operating a plurality of virtual servers (server instances) on a physical server device), a distributed processing technology (a technology of distributing computation and a processing by a plurality of nodes), and other technologies are used.

[Public Cloud]

As one of cloud computing systems, there is a "public cloud (public cloud system)". In the public cloud, a service (resource) such as a server and a storage is provided to an unspecified number of users. As the public cloud, for example, Amazon EC2 (Amazon Elastic Compute Cloud) or others is cited (see in "Amazon Elastic Compute Cloud (Amazon EC2) searched on Mar. 1, 2011, on the Internet <URL: http://aws.amazon.com/jp/ec2/>" (Non-Patent Document 1)).

[Integrated Monitoring System]

Also, there is an information processing system (integrated monitoring system) of monitoring an error or a failure of a monitoring target system (monitored system) which is the cloud computing system. For example, Japanese Patent Application Laid-Open Publication No. 2006-72784 (Patent Document 1) (describing "integrated monitoring system") or others is cited.

SUMMARY OF THE INVENTION

In an information processing system including an integrated monitoring system and its monitoring target system, when a public cloud is used as the monitoring target system, the following problems arise in identification and management of each of a plurality of virtual servers configuring the monitoring target system (public cloud) (note that the following description corresponds to FIG. 7).

In the public cloud, by one server disk image (data), a plurality of server instances are appropriately activated. The server instances are operated as virtual servers on a physical server device. In this case, the plurality of activated server instances hold the same ID (identifier or identification information) (for description, referred to as a "server ID") because their server disk images of an activation source are the same. Note that this ID represents an ID used for the integrated monitoring.

Therefore, when the integrated monitoring system (including a monitoring server or others) monitors a failure or others of the servers (virtual servers) configuring the monitoring target system (public cloud), the servers cannot be identified (distinguished) as individual nodes (virtual servers) because the plurality of server instances have the same ID (server ID).

For example, each server instance (corresponding to monitoring agent) in the monitoring target system transmits a monitor data to a monitoring server in the integrated monitoring system when the failure, error, or others occurs in the server instance. An ID information showing the server instance is contained in (attached to) the monitor data. However, as described above, each monitor data of the plurality of server instances adversely has the same ID (server ID).

Therefore, even if the monitoring server receives each monitor data described above, it cannot be recognized which server instance has the failure or error. Therefore, the integrated monitoring system (monitoring server) cannot achieve the detailed monitoring of the monitoring target system (public cloud) or others. For example, as recognizing a status of each individual virtual server, a performance of a virtual server group cannot be recognized and evaluated.

In consideration of the above description, a preferred aim of the present invention is to provide a technology, in an information processing system including an integrated monitoring system and its monitoring target system (more particularly, public cloud system), the technology capable of achieving detailed monitoring for a plurality of virtual servers by the appropriate identification of the plurality of virtual servers, the ID information management, and others.

To achieve the above preferred aim, a typical embodiment of the present invention is, in an information processing system including an integrated monitoring system and its monitoring target system (more particularly, public cloud system), the information processing system (virtual server ID managing system) and a program of identifying a plurality of virtual servers and managing their ID information, and others, and has the following structure.

The present embodiment (virtual server ID managing system) has an ID managing function of managing an ID with using information processing of a computer for a monitor processing for each of a plurality of server instances to be activated as virtual servers from one or more server disk images of an activation source in a monitoring target system. The ID managing function performs a processing of providing a uniquely-identifiable ID to each of the plurality of server instances to identify each of the plurality of server instances by referencing an ID in the monitor processing.

Also, the ID managing function includes: an ID providing unit; an ID storage unit; a monitor-data transmitting unit; a monitor-data receiving unit; and others.

The ID providing unit performs, when the server instance is activated from the server disk image in the monitoring target system, a processing of determining whether to newly generate and provide an ID based on a predetermined reference. When the server instance is newly activated, the ID providing unit generates and provides a new ID different from an existing ID. When the server instance is restarted, the ID providing unit provides an ID so as to continuously use the same ID as that used at the previous activation.

The ID storage unit performs a processing of storing the information containing the ID provided to each server instance in storage means and using the information in the activation of each server instance.

The monitor-data transmitting unit performs a processing of attaching the information containing the ID provided to the server instance to monitor data to be transmitted for the monitor processing. The monitor-data receiving unit performs a processing of retrieving the information containing the ID attached to the monitor data to be received for the monitor processing.

According to the typical embodiment of the present invention, in the information processing system including the integrated monitoring system and its monitoring target system (more particularly, public cloud system), the detailed monitoring for the plurality of virtual servers can be achieved by the appropriate identification of the plurality of virtual servers, the ID information management, and others.

BRIEF DESCRIPTIONS OF THE DRAWINGS

Figure 6:
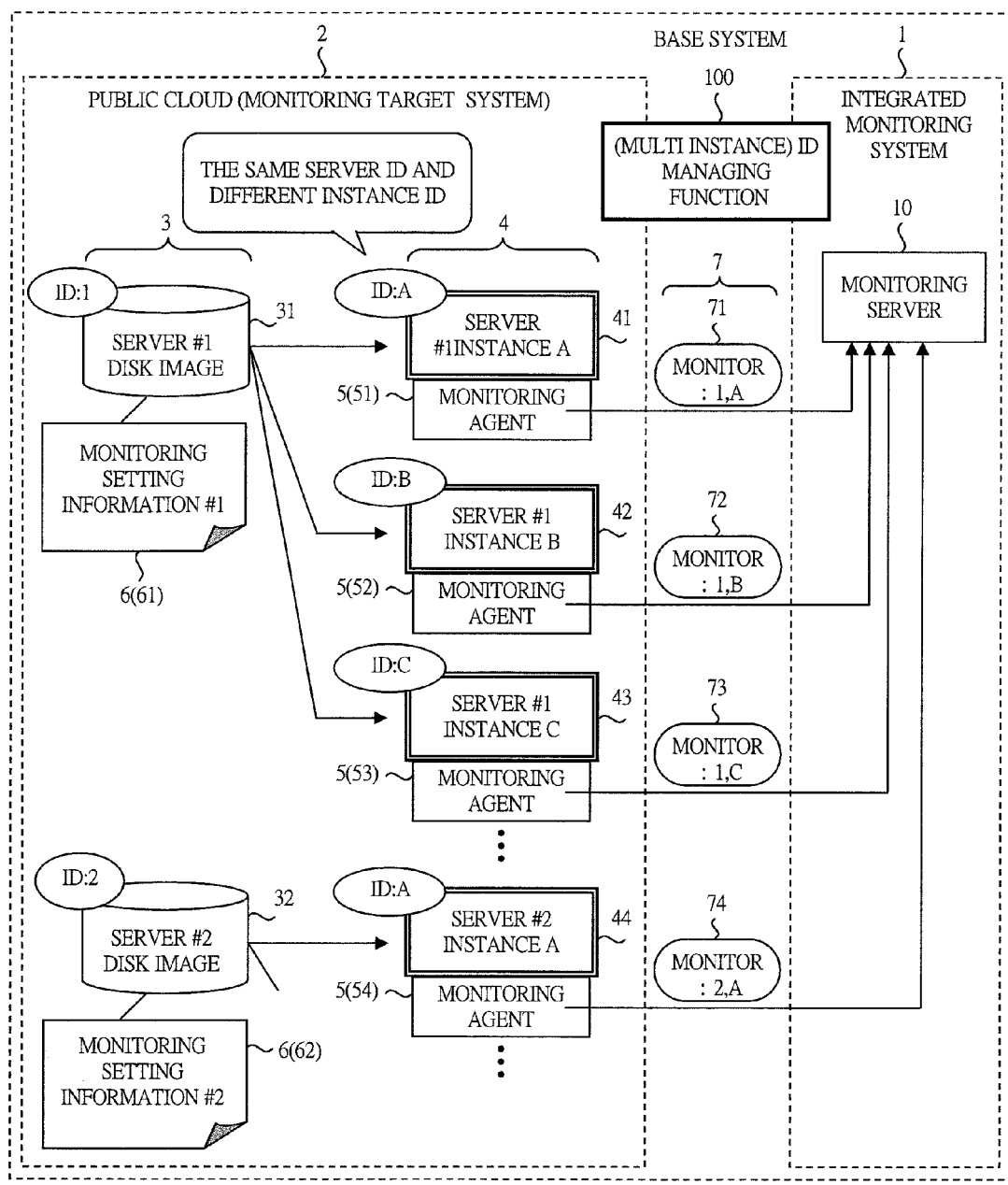
Figure 7:
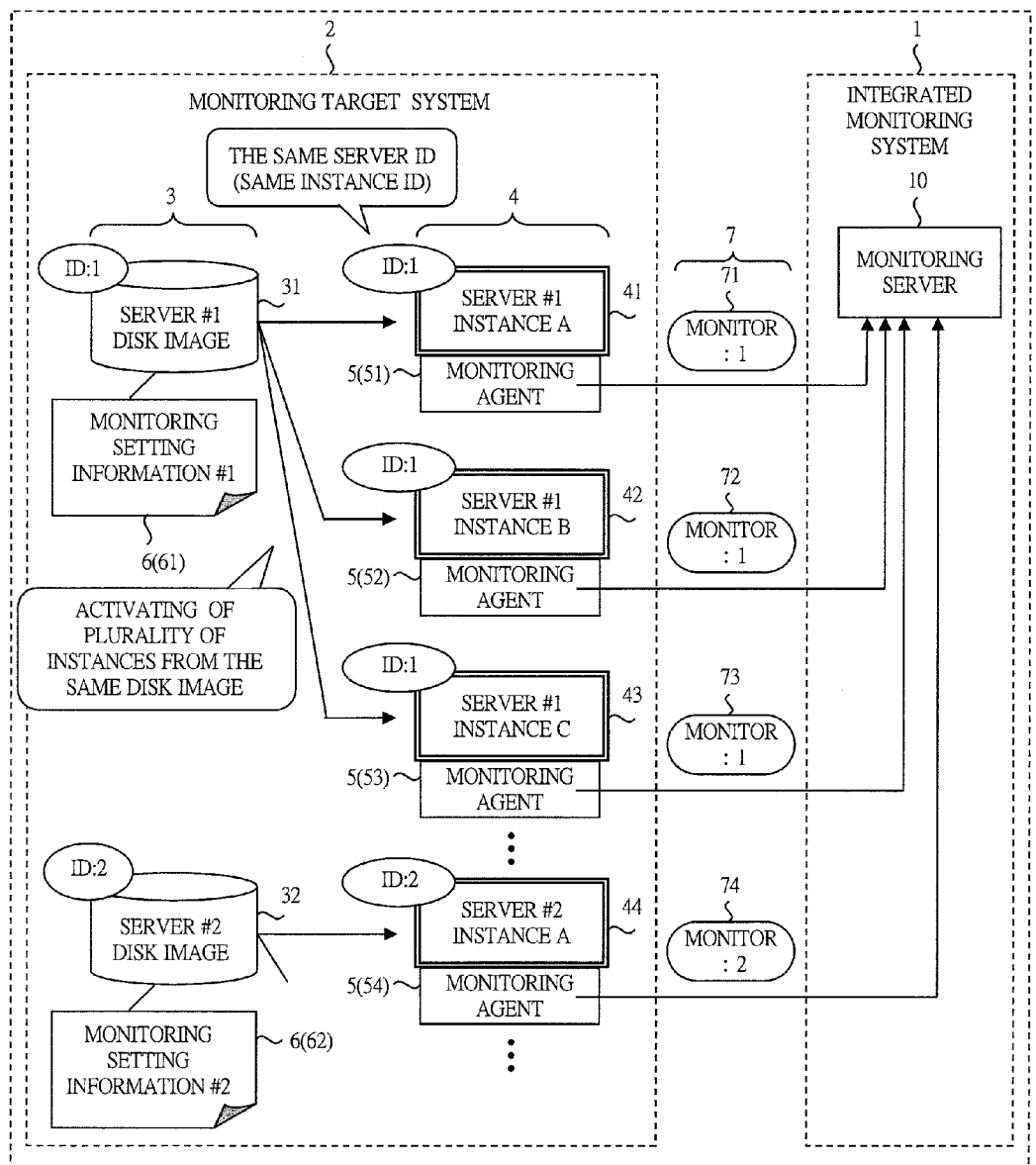

FIG. 6 is a diagram illustrating a structure outline of an entire information processing system according to an embodiment of the present invention (more particularly, in a case of a second method); and FIG. 7 is a diagram illustrating an entire structure outline and an ID example of an information processing system (a system including an integrated monitoring system and a monitoring target system) according to a conventional technology example.

DESCRIPTIONS OF THE PREFERRED EMBODIMENTS

Figure 1:
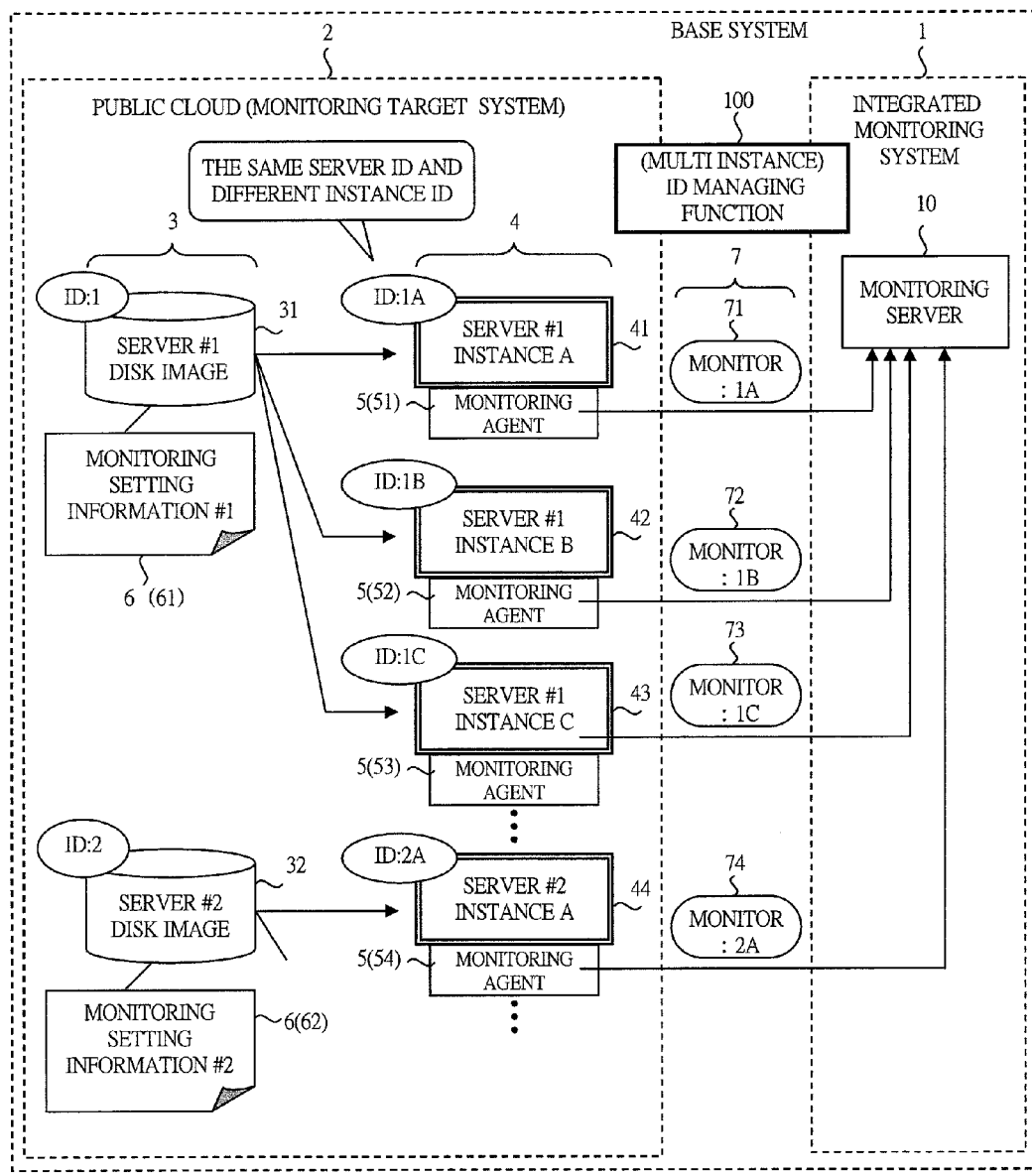
FIG. 1 is a diagram illustrating an entire structure outline and an ID example of an information processing system (a virtual server ID managing system including an integrated monitoring system, a monitoring target system, and an ID managing function) according to an embodiment of the present invention (more particularly, in a case of a first method)
Figure 2:
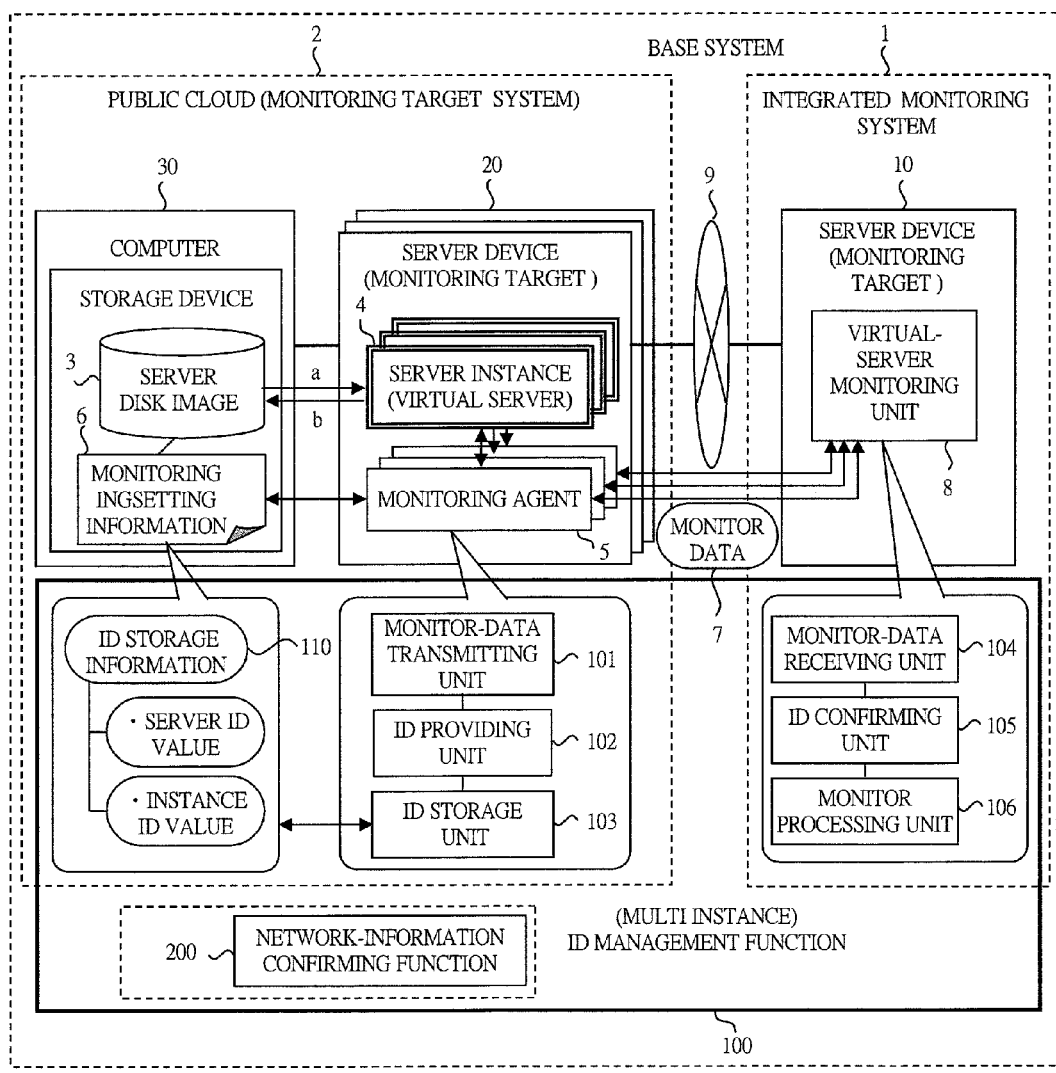
FIG. 2 is a diagram illustrating an implementation structure example of the system according to the embodiment.
Figure 3:
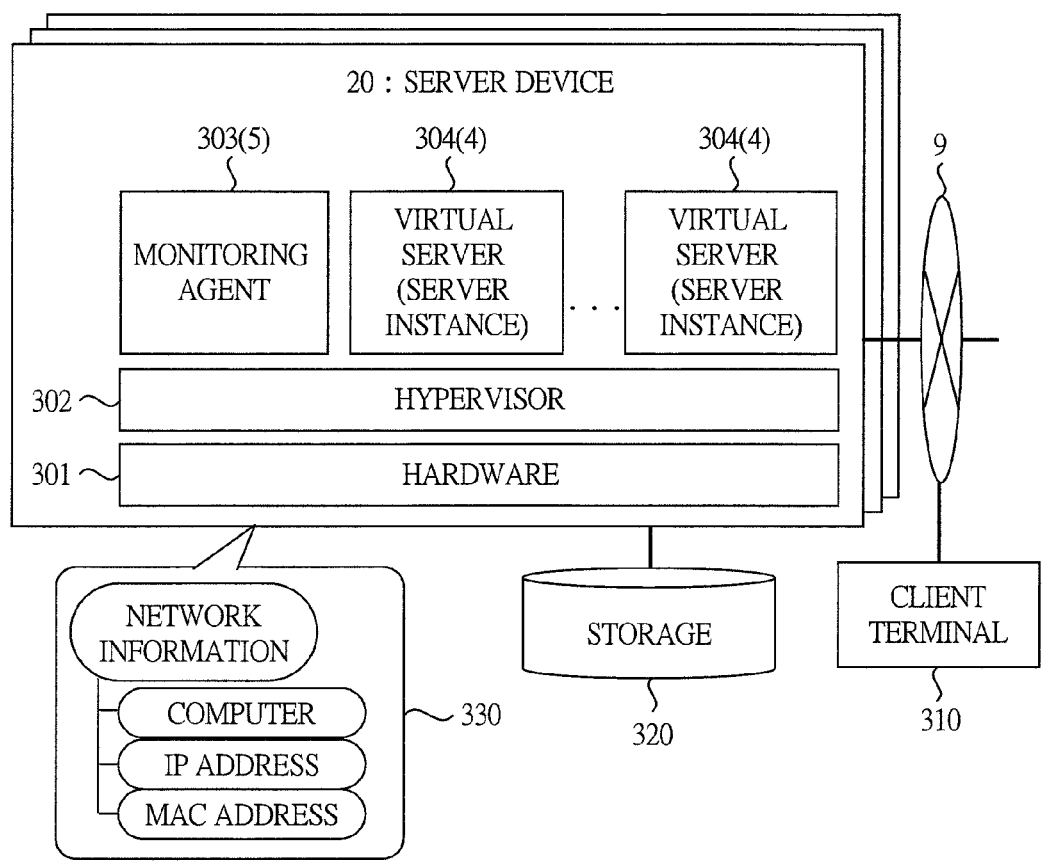
FIG. 3 is a diagram illustrating a structure example relating to a virtual server of the system according to the embodiment.
Figure 4:
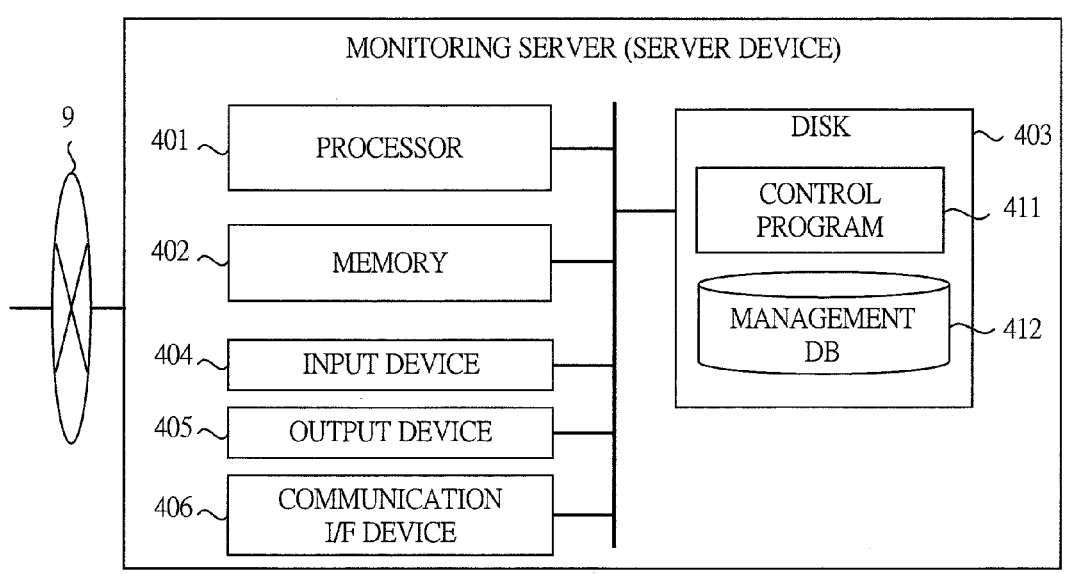
FIG. 4 is a diagram illustrating a structure example relating to a monitoring server of the system according to the embodiment.
Figure 5:
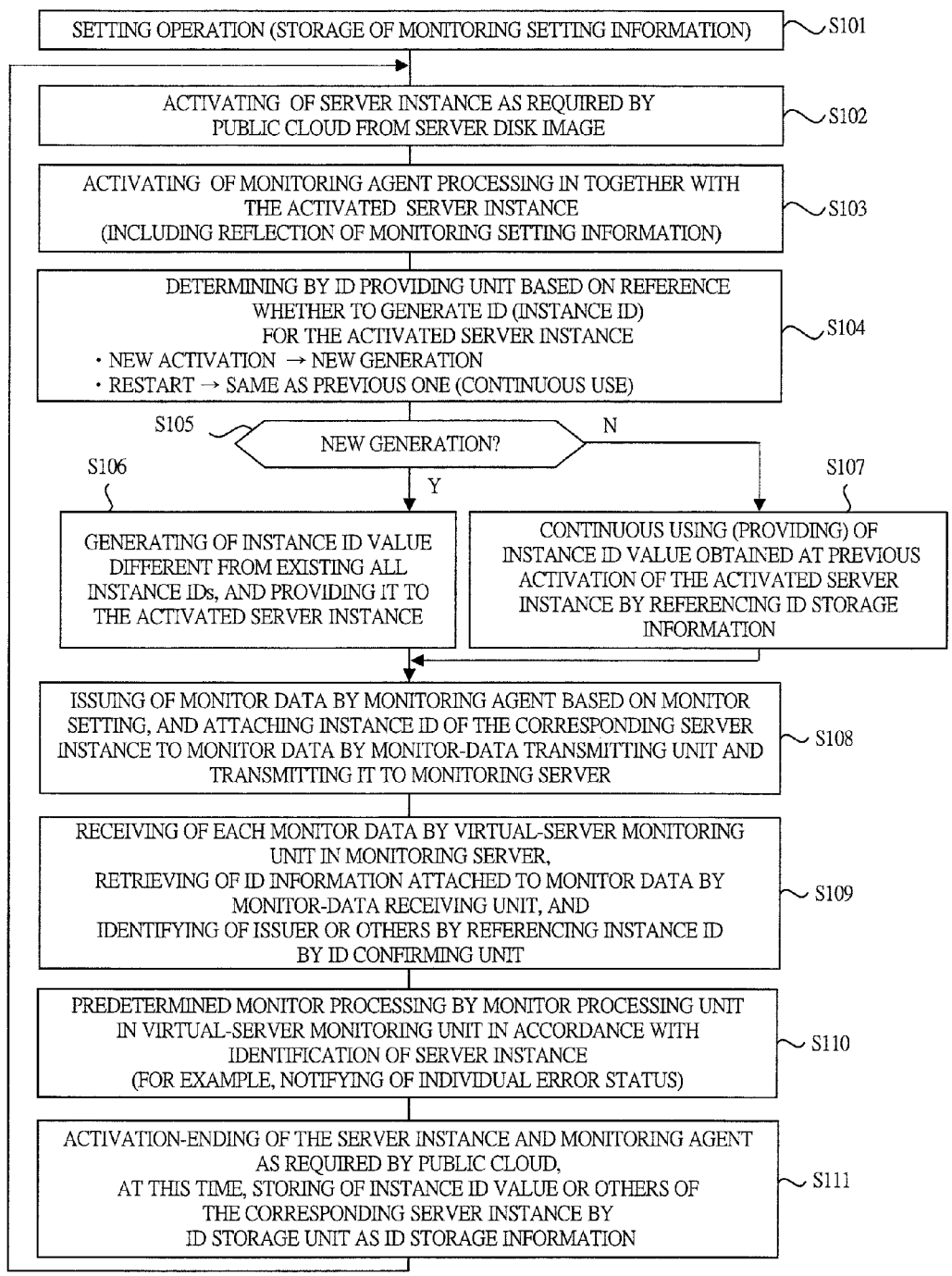
FIG. 5 is a diagram illustrating a main processing sequence in the system according to the embodiment.

Hereinafter, embodiments of the present invention will be described in detail with reference to the accompanying drawings. Note that the same components are denoted by the same reference symbols throughout the drawings for describing the embodiments in principle, and the repetitive description thereof will be omitted. FIG. 1 (and FIG. 6) understandably illustrates an outline of the present embodiments. FIGS. 2 to 4 are implementation structure examples. FIG. 5 illustrates a sequential processing outline. FIG. 7 illustrates a conventional technology example for comparison. A main characteristic component is an ID managing function 100 in FIGS. 1 and 2.

Conventional Technology Example

First, a conventional technology example based on studies of the inventor is briefly described. FIG. 7 illustrates an entire structure outline and an ID example of an information processing system according to the conventional technology example. An integrated monitoring system 1 and a monitoring target system 2 are connected to each other via a network (the Internet). The monitoring target system 2 is, for example, a cloud computing system using a facility such as a datacenter of a service provider, and is a system of providing a hosting service to customers or others. For example, there are a service style ("private cloud") in which a server (a physical server device and a virtual server operated thereon) or others is fixedly rented to a customer such as a company and a service style ("public cloud") in which a server (a physical server device and a virtual server operated thereon) or others is rented by dynamic ensuring (allocation) to an unspecified number of users.

In the monitoring target system 2, more particularly, in a public cloud, each of a plurality of server instances 4 (for example, denoted as 41 to 43) is appropriately activated (or the starting is appropriately ended) as a virtual server from one same server disk image 3 (activation source) (for example, denoted as 31). Note that a state, a structure, and others in which each of the plurality of server instances 4 is activated from one server disk image 3 as described above are referred to as "multi-instance" for description. Note that the meaning of "activation" includes not only initially activating the server instance 4 from the server disk image 3 but also activating the server instance 4 once, ending the activation, storing its state as a server disk image 3, and, from the state, activating the server instance 4 again.

Each of the plurality of virtual servers (server instances) 4 provides, for example, a predetermined service processing (a service by the cloud computing) or others in response to an access from a client terminal via the network.

Also, a monitoring server 10 of the integrated monitoring system 1 performs a predetermined monitor processing (a monitoring service) for a target including a group of the virtual servers 4 in the monitoring target system 2. This monitor processing (monitoring service) is achieved by using a processing by a monitoring agent 5 associated with each virtual server 4. The monitoring agent 5 is an agent module of the monitoring server 10 (virtual-server monitoring unit), is achieved by a program processing or others, and is operated on the associated virtual server 4 or operated parallely with the virtual server 4. The monitoring agent 5 is appropriately activated/ended in accordance with an operation status (such as the activation/end) of the virtual server 4 to be monitored. FIG. 7 illustrates a state in which each monitoring agent 5 is operated for each server instance 4.

Also, to each server disk image 3, monitoring setting information 6 for the monitor processing (monitoring service) (by the monitoring agent 5) is provided. The monitoring setting information 6 is set by an integrated monitoring system 1 side, and is stored for each server disk image 3. As an example of the monitoring setting information 6, a "server #1 disk image" 31 has "monitoring setting information #1" 61. The monitoring setting information 6 contains the defining and setting information about which monitor data 7 is to be issued under which condition and status in the virtual server (server instance) 4. As an example of a content of the monitoring setting information 6, there is the setting of issuing the monitor data 7 containing information indicating an error when an access or load amount of the virtual server 4 exceeds a threshold.

The monitoring setting information 6 for the server disk image 3 of the activation source is reflected as the setting for the monitor processing (monitoring service) of the monitoring agent 5 associated with each activated server instance 4. Based on the monitoring setting information 6, the monitoring agent 5 monitors the status of the associating server instance 4, issues the monitor data 7, and transmits it to the monitoring server 10.

The monitoring server 10 (virtual-server monitoring unit) receives and processes each monitor data 7, so that a predetermined monitor processing for the group of the virtual servers 4 in the monitoring target system 2.

In the integrated monitoring system 1, each server (the associating server disk image 3) is managed with the ID ("server ID"). That is, for a plurality of servers (server disk images 3), different server IDs are provided. For example, in FIG. 7, the server ID of the "server #1 disk image" 31 as a first server disk image is "1", and the server ID of a "server #2 disk image" 32 as a second server disk image is "2". Note that the ID value is denoted as "1", "A", or others for simplicity. However, an actual ID value is a numerical value, a character string, or others, which has a predetermined format.

And, each of the plurality of virtual servers (server instances) 4 activated from one same server disk image 3 is also managed with the same ID (server ID) as that of the activation source. For example, in FIG. 7, each ID of a "server #1 instance A" 41 as a first virtual server, a "server #1 instance B" 42 as a second virtual server, and a "server #1 instance C" 43 as a third virtual server is "1". For monitoring them (41 to 43), the same "monitoring setting information #1" 61 is applied.

Note that, in a general concept of the cloud computing, there is no need to notice or recognize an individual virtual server by a server user side, and therefore, even in the integrated monitoring system 1 of the conventional technology example, each of the plurality of virtual servers (server instances) 4 is managed with the same ID (server ID) (conventionally, there is no concept of "instance ID" but only a concept of "server ID").

Here, conventionally, the monitor data 7 (for example, 71 to 73) issued from each of the plurality of virtual servers (server instances) 4/the monitoring agent 5 contains the "server ID" information as information for indicating a monitoring target and an issuer. For example, to each of the monitor data 71 from the monitoring agent 51 of the "server #1 instance A" 41, the monitor data 72 from the monitoring agent 52 of the "server #1 instance B" 42, and the monitor data 73 from the monitoring agent 53 of the "server #1 instance C" 43, the same value ("1") as that of the server ID of the activation source is attached. In this manner, the monitoring server 10 can identify and monitor each virtual server of the activation source.

However, by using the ID information (server ID) attached to each monitor data 7, the monitoring server 10 cannot distinguish the plurality of individual virtual servers (server instances) 4 of the same activation source from each other, and therefore, for example, cannot perform the detailed monitoring for the individual virtual servers 4.

[Virtual Server ID Managing System (ID Managing Function)]

Based on the conventional technology example, the present embodiment (the virtual server ID managing system, the integrated monitoring system, and others) is described below.

FIG. 1 illustrates an entire structure outline and an ID example of an information processing system (a system including an integrated monitoring system, a monitoring target system, and an ID managing function) according to the present embodiment (more particularly, in a case of a method of identifying with an instance ID).

The present system includes a (multi-instance) ID managing function 100 functioned as an ID management mechanism in which multi-instance servers (each of a plurality of virtual servers (server instances) 4) in a monitoring target system 2 (more particularly, public cloud) can be appropriately identified. This ID managing function 100 (configuring a virtual server ID managing system) can achieve, for example, a detailed monitor processing, whose target is a group of the virtual servers 4 in the monitoring target system 2, by an integrated monitoring system 1.

As different from the conventional technology example, even when their server disk images 3 of the activation source are the same, the ID managing function 100 manages the ID information so as to generate and provide different IDs (each referred to as "instance ID" for description) to each of the plurality of server instances 4.

For example, each server disk image 3 holds the same ID ("server ID") as that of the conventional technology example. In addition, the ID managing function 100 provides a uniquely-identifiable different instance ID to each of the plurality of server instances 4 to be activated for each server disk image 3 of the activation source. Each of these instance IDs is an ID (global unique ID) (for example, a 32-digit character string) by which all virtual servers (server instances) 4 to be monitored in the monitoring target system 2 can be uniquely identified as an individual node. With this instance ID, each of the virtual servers 4 can be distinguished as an individual node, and the detailed monitoring can be achieved as, more particularly, a usage of integrated monitoring.

Note that FIG. 1 illustrates a case of a managing method (first method) in which the monitoring server 10 side can uniquely identify the virtual server 4 side only with the instance ID. On the other hand, FIG. 6 illustrates a case of a managing method (second method) in which the monitoring server 10 side can uniquely identify the virtual server 4 side with a combination of "the server ID+the instance ID" described above. Either mode is possible.

In the ID managing function 100, when each of the plurality of server instances 4 is activated from the server disk image 3, a monitoring agent 5 provides the instance ID (separately from the server ID) to the corresponding server instance 4 in accordance with a predetermined reference (described later).

For example, in FIG. 1, when the server ID of the server #1 disk image 31 of the activation source is "1", the instance ID of each of the plurality of server instances 4 (for example, a "server #1 instance A" 41, a "server #1 instance B" 42, and a "server #1 instance C" 43) activated from this server #1 disk image 31 is provided by the ID managing function 100 as "1A", "1B", and "1C", respectively.

Note that, in the method of FIG. 1, the information of the activation-source server ID (for example, "1") is contained in the instance ID. For example, a numerical number "1" of the value "1A" represents a server ID value of the activation-source server disk image 3 (31), and a symbol "A" of the "1A" represents a value corresponding to the server instance 4 (41). In the method of FIG. 6, this information is separately handled. For example, the instance ID is "A", "B", or others.

Also, in the ID managing function 100, the monitoring agent 5 attaches the information of the instance ID for each above-described virtual server (server instance) 4 to an associating monitor data 7. That is, the monitor data 7 to be transmitted from the virtual server 4 (the associating monitoring agent 5) to be monitored to the monitoring server 10 contains the information of the above-described instance ID.

For example, in FIG. 1, among the plurality of server instances 4 (instance IDs: "1A", "1B", "1C", and others) from the server #1 disk image 31 (server ID: "1") of the activation source, the monitor data 71 from the "server #1 instance A" 41 contains the "1A" as the ID information. Also, in the case of FIG. 6, the monitor data 71 contains a pair of "1" and "A" as the ID information.

By referencing the ID information attached to each received monitor data 7, the monitoring server 10 can identify and confirm the activation-source server disk image 3 and an individual virtual server (server instance) 4. In this manner, the detailed monitor processing for each of the plurality of virtual servers 4 or others can be achieved. For example, in FIG. 1, by the instance ID "1A" ("1" and "A" in FIG. 6) attached to the monitor data 71, it can be found that the activation-source server disk image 3 is the "server #1 disk image" 31 and the individual server instance 4 is the "server #1 instance A" 41.

[Reference]

The ID managing function 100 has a predetermined reference as the following ((1) to (3)) in generating and providing the instance ID to the server instance 4.

(1) In a case that (when) the server instance 4 is newly activated (image-activated or booted) from the server disk image 3 by the public cloud 2, the instance ID is newly generated and provided to the server instance 4. That is, in this manner, the corresponding server instance 4 holds an instance ID value different from instance ID values of all existing server instances 4 (including other server instances 4 of the same activation source). Also, when the activation of the server instance 4 is ended, information of the corresponding instance ID value is stored.

(2) In a case that (when) the server instance 4 is restarted, the same instance ID as the instance ID in the previous activation of the corresponding server instance 4 (before the activation ends or in the previous activation) is provided so as to be continuously used. At this time, for example, the information of the instance ID stored in the activation end is used. It is prevented as much as possible to generate (reattach) the instance ID value for each restart.

Note that the "restart" includes to activate immediately after the activation end of the server instance 4 once, or, to store the status at the time of the activation end of the server instance 4 as the server disk image 3 and activate the server instance 4 from the server disk image 3 as required so as to restore the status at the previous activation, and others.

(3) In a case that (when) the processing of the monitoring agent 5 for achieving the monitor processing (monitoring service) by the integrated monitoring system 1 is activated or stopped (activation-ended) in accordance to the operation of the corresponding server instance 4, the same instance ID as that in the previous activation is continuously used as the instance ID of the corresponding server instance 4.

Note that, regarding the above-described reference, as described in the (2) and others, the instance ID value once generated is basically continuously used as long as possible on a time axis. In this manner, the status of the server instance 4 can be consistently recognized on the time axis. That is, the detailed monitoring or others can be achieved.

Note that the instance ID value different from that in the previous activation can be reattached (changed) under a condition that all server instances 4 are identifiable. In that case, the status of the server instance 4 can be recognized on the time axis for each non-changed period. Also, if a correspondence correlation among the ID information before and after the change and others are managed, the status can be recognized on a time axis including periods before and after the change.

[Implementation Structure]

With reference to FIG. 2, an example of an implementation structure of the system according to the present embodiment is described. As the implementation structure, the ID managing function 100 includes: processing units (101 to 103) included in the monitoring agent 5 on the monitoring target system 2 (virtual server 4) side; and processing units (104 to 106) included in the virtual server monitoring unit 8 on the integrated monitoring system 1 (monitoring server 10) side, and the ID managing function 100 is achieved by a software program processing or others. Note that a network-information confirming function 200 included in the ID managing function 100 will be described later.

The integrated monitoring system 1 includes the monitoring server 10 (server device) and others. The monitoring server 10 includes the virtual-server monitoring unit 8 and others. The virtual-server monitoring unit 8 performs the predetermined monitor processing (monitoring service) which targets at the group of the virtual servers 4 in the monitoring target system 2 as cooperating with each monitoring agent 5.

In the integrated monitoring system 1, as using the ID managing function 100, the statuses of all virtual servers 4 in the monitoring target system 2 can be collectively recognized, and the status of each individual virtual server 4 can also be recognized. Based on the record of the monitor data 7 and others, a query of each status is also possible. For example, the number of activation of the virtual servers 4, the access and load amounts, the failure and error statuses, service performance, and others can be recognized. In the present invention, a content of the integrated monitor processing is not particularly limited.

The monitoring target system 2 is particular a public cloud system. The public cloud system 2 includes: a computer 30 including a storage device for storing the server disk images 3; and one (or more) server device 20 for operating the virtual server (server instance) 4. Each device described above is connected to a network 9.

The server disk image 3 is a data, such as a server program determinately stored in a storage device (such as a disk) of the computer 30. The monitoring setting information 6 for each server disk image 3 contains ID storage information 110. The ID storage information 110 contains information of the server ID value, the instance ID value, and others.

Each virtual server 4 operated in the server device 20 is operated so as to be associated with the monitoring agent 5. In FIG. 2, the virtual server 4 and the monitoring agent 5 are associated with each other one on one. The monitoring agent 5 is activated together with, for example, the time when the corresponding virtual server (server instance) 4 is activated from the server disk image 3, and the activation is ended together with, for example, the time when the activation of the corresponding virtual server (server instance) 4 is ended.

When the public cloud 2 (the computer 30 or the server device 20) activates the server instance 4 from the server disk image 3 ("a" in FIG. 2) and ends (stores) the server instance 4 ("b" in FIG. 2), for example, the activation/end of the server instance 4 is automatically determined and executed based on a determination of the access and load amounts of the activating (service-providing) virtual server 4.

Each monitoring agent 5 includes: a monitor-data transmitting unit 101; an ID providing unit 102; an ID storage unit 103; and others.

When the server instance 4 is activated from the server disk image 3 by the public cloud 2, the instance ID is provided to the activating server instance 4 by the ID providing unit 102 of the corresponding monitoring agent 5 in accordance with the above-described reference. In the processing of the monitoring agent 5, information containing the instance ID is stored.

The monitor-data transmitting unit 101 issues the monitor data 7 in accordance with the monitoring setting information 6, and transmits the data to the monitoring server 10 (virtual-server monitoring unit 8). At that time, the monitor-data transmitting unit 101 attaches the ID information containing the above-described instance ID to the monitor data 7 such as its header.

The ID providing unit 102 generates and provides the instance ID based on the reference to each server instance 4 activated by the public cloud 2. Note that, as described above, no instance ID value may be generated in some cases. In these cases, the storage information is used as the ID storage information 110.

For each activating server instance 4 ended by the public cloud 2, the ID storage unit 103 stores the information containing the provided instance ID as the ID storage information 110. Note that this information may be stored at not only the activation end.

The virtual-server monitoring unit 8 of the monitoring server 10 includes: a monitor-data receiving unit 104; an ID confirming unit 105; a monitor-processing unit 106; and others.

The monitor-data receiving unit 104 receives the monitor data 7 from the monitoring agent 5 of each server instance 4 via the network 9. The monitor-data receiving unit 104 retrieves the ID information attached to the received monitor data 7 (such as its header).

The ID confirming unit 105 confirms the instance ID in the ID information retrieved from the received monitor data 7 to identify and confirm the activation-source server disk image 3 and the individual server instance (virtual server) 4 or others.

With using the monitor data 7a and result of the identification and confirmation by the ID confirming unit 105, the monitor-processing unit 106 performs the predetermined monitor processing including the recognition of the status of the individual virtual server 4. For example, from the content of the monitor data 7, when it is detected that a status of a certain virtual server 4 is the error state, a processing of issuing an error notification of a corresponding content to a predetermined destination is performed.

[Virtual Server]

FIG. 3 illustrates a structure example of the virtual server 4 and the server device 20. The server device 20 includes: a hardware 301; a hypervisor 302; a monitoring agent 303 (5); and a virtual server (server instance) 304 (4). Although this example illustrates a case that the virtual server 4 is operated in a known hypervisor method, it may be operated in another method.

The server device 20 may be connected to a storage 320, a client terminal 310 (terminal of an end user using the service), and others. In the storage 320, data information relating to the service or others may be stored. Also, the server device 20 stores known information such as a computer name, an IP address, and a MAC address as network information 330. The public cloud 2 includes a function of allocating the network information 330 to the server device 20.

The hardware 301 is a known element such as a CPU, a memory, a disk, an input/output device. The hypervisor 302 is operated on the hardware 301. On the hypervisor 302, a resource of the hardware 301 is virtualized and used to control of operating a plurality of virtual machines, virtual OSes, an application software program thereon (including the monitoring agent 303 (5) and the virtual server 304 (4)), or others. The monitoring agent 303 and the virtual server 304 can be communicated with each other on the hypervisor 302. The processing of the monitoring agent 303 (5) includes a program processing of each of the processing units (101 to 103) in FIG. 2.

[Monitoring Server]

FIG. 4 illustrates a structure example of the monitoring server 10 (server device). The monitoring server 10 includes known elements such as a processor 401, a memory 402, a disk 403, an input device 404, an output device 405, and a communication I/F device 406. The processor 401 appropriately loads a code from a control program 411 stored in the disk 403 into the memory 402 to execute it or loads each type of data information from a management DB 412 into the memory 402 to process it, so that each type of processing functions including the virtual-server monitoring unit 8 (including 104 to 106) in FIG. 2 is achieved. The management DB 412 is, for example, data information relating to the predetermined monitor processing, and may store the received monitor data 7 or may store the information containing the instance ID.

Also, in the monitoring server 10, other terminal devices connected to the monitoring server 10, or others, with using the output device 404, the communication I/F device 405, and others, the information containing the instance ID relating to the predetermined monitor processing may be displayed on a screen based on the monitor data 7 so that the information can be confirmed by an administrator or others.

[Processing Sequence]

With reference to FIG. 5, an example of a main processing sequence in the entire present system is described. A symbol "S101" and others denote processing steps.

(S101) As a preliminary stage of operation or others, a setting operation for the monitoring target server and the predetermined monitor processing is previously performed by the administrator. That is, via a user interface (provided by the integrated monitoring system 1), the administrator performs various-type setting operations such as setting the monitoring target server (such as the corresponding server disk image 3) in the monitoring target system 2, setting the predetermined monitor processing to be performed (for example, the detection of the failure and error), and setting the ID managing function 100 (for example, the method for the ID). In this manner, the monitoring setting information 6 associated for each server disk image 3 is stored.

(S102) At the operation, as described above, the public cloud 2 (the computer 30 and the server device 20) activates the server instance 4 from the server disk image 3 as required (for example, in accordance with the determination of the access amount).

(S103) Also, the public cloud 2 (the computer 30 and the server device 20) activates a processing of the monitoring agent 5 associated with the server instance 4 activated in the step of S102. The corresponding monitoring agent 5 monitors the operation and status of the corresponding the server instance 4 based on the corresponding monitoring setting information 6.

(S104) In the ID managing function 100, the ID providing unit 102 of the monitoring agent 5 activated in the step of S103 determines whether or not the ID (instance ID) should be generated for the corresponding activating server instance 4 based on the above-described predetermined reference. That is, for example, in the case of the newly-activated server instance 4, the determination is made so as to generate a new instance ID for provision to the server instance 4 (the above-described reference (1)). And, in the case of the restarted server instance 4, the determination is made so as to continuously use the instance ID of the corresponding server instance 4 as that in the previous activation (the above-described reference (2)).

(S105) Based on the determination in the step of S104, in the case (Y) of new generation, the processing proceeds to a step of S106. Otherwise, that is, in the case (N) of the same as the previous one, the processing proceeds to a step of S107.

(S106) In the step of S106, the ID providing unit 102 generates an instance ID value different from the already-generated and provided instance ID value for the all existing server instances 4 which are the monitoring target in the monitoring target system 2, and then, provides the instance ID value to the activating server instance 4. At this time, the ID storage information 110 may be referenced.

(S107) In the step of S107, the ID providing unit 102 references the ID storage information 110 with using the ID storage unit 103, references the information such as the instance ID value stored in the previous activation end of the activating server instance 4, and provides the instance ID value so as to continuously use the value.

(S108) The monitoring agent 5 for the server instance 4 appropriately issues the monitor data 7 based on the monitoring setting information 6. At that time, the monitor-data transmitting unit 101 writes the instance ID value (the server ID value may be added thereto) of the server instance 4 to the monitor data 7 (for example, its header) and attaches it, and then, transmits the data to the monitoring server 10.

(S109) The virtual-server monitoring unit 8 of the monitoring server 10 receives each monitoring data 7 from the monitoring agent 5 side. At that time, the monitor-data receiving unit 104 retrieves the ID information attached to the monitor data 7 (for example, its header). The ID confirming unit 105 references the instance ID value of the information or others, so that it is detected and confirmed from which virtual server 4 (the activation-source server disk image and the individual server instance 4) (the issuer) in the monitoring target system 2 the monitor data 7 has been issued.

(S110) In the virtual-server monitoring unit 8 of the monitoring server 10, the predetermined monitor processing is performed by the monitor processing unit 106 in accordance with the identification of the server instance 4. For example, when it is detected and recognized from the received monitor data 7 that the individual server instance 4 is in the error status, the corresponding error notification is issued to the predetermined destination.

(S111) As described above, the public cloud 2 (the computer 30 and the server device 20) ends the activation status of the server instance 4 as required (for example, in accordance with the determination of the access amount), and stores the status as, for example, the server disk image 3. Also, it ends the activation of the monitoring agent 5 associated with the server instance 4 whose activation is ended. At that time, the ID storage unit 103 stores the instance ID value or others provided to the server instance 4 whose activation is ended, in the ID storage information 110 (which can be used in the step of S107). Note that the value may be stored at another timing. Hereinafter, the processing is similarly repeated from the step of S102.

[Use of Network Information]

Next, as an example of an additional processing function in the ID managing function 100, a network-information confirming function 200 of FIG. 1 is described. The implementation of the network information confirming function 200 is achieved as, for example, one processing unit in the monitoring agent 5. A processing by the network-information confirming function 200 is performed between the steps of, for example, S103 and S104 in FIG. 5.

According to studies by the inventor, in an example of the conventional public cloud system, the following structure is adopted for management of servers (server instances). At the activation of the server instance from the server disk image by the public cloud, in the activation server instance (the operated server device), every network information such as the computer name, the IP address, and the MAC address (corresponding to 330 of FIG. 3 in the present embodiment) is changed. That is, the network information is allocated at each time, and is not continuously used on the time axis. Further, at the restart of the server instance, the same network information as that before the restart is used. For example, at the activation of the server instance, a local IP address is allocated to a computer (server), and a computer name based on a corresponding global IP is allocated thereto. Note that the network information is various-type information for communication, and is not for distinguishing individual nodes (different from the ID concept). For example, even if the servers have the same IP address, they are not necessarily the same.

On the other hand, in the network-information confirming function 200, the network information (containing its management method) of the above-described monitoring target system 2 is used for the determination in the ID management of the multi-instance, more particularly, the ID generation. It is assumed that the method for the management (the allocation of the network information to the server device 20 and the virtual server 4 and others) of the network information 330 in the monitoring target system (public cloud) 2 is the same as, for example, the method of the above-described example.

The network information confirming function 200 in the processing of the monitoring agent 5 references and confirms the status of the allocation of the corresponding network information 300 (a set of the computer name, the IP address, the MAC address, and others) at the activation of the server instance (virtual server) 4, and uses this result for the determination of the generation of the instance ID by the ID providing unit 102.

For the corresponding server instance (virtual server) 4 or its server device 20, the network-information confirming function 200 compares a value of the allocation of the network information 330 at this time (current moment) and a value of the corresponding network information 330 at the previous activation to determine whether they have been changed or not. If they have been changed, it can be determined or assumed that the server instance 4 at the previous time is different from the server instance 4 at this time (the new activation or others can be determined or assumed). From this point, the ID providing unit 102 generates and provides the new instance ID to the server instance 4 activated at this time (corresponding to the above-described reference (1)).

Also, if they have not been changed, it can be determined or assumed that the server instance 4 at the previous time is the same as the server instance 4 at this time (the restart or others can be determined or assumed). For this point, the ID providing unit 102 provides the same instance ID as that at the previous activation to the server instance 4 activated at this time so as to continuously use the instance ID (corresponding to the above-described reference (2)).

[Effects and Others]

As described above, according to the present embodiment, the plurality of virtual servers 4 is appropriately identified and the ID information (including the instance ID) is managed by the ID managing function 100, so that the detailed monitoring for the plurality of virtual servers 4 in the monitoring target, system 2 by the public cloud or others can be achieved. More particularly, the monitoring service (the integrated monitoring) for the multi-instance by the public cloud or others can be achieved. By the advance of use of the public cloud or others, the plurality of server instances 4 are activated on a daily basis, and therefore, it is effective to distinguish and recognize the server instances 4 by the present technology.

In the foregoing, the invention made by the inventor of the present invention has been concretely described based on the embodiments. However, it is needless to say that the present invention is not limited to the foregoing embodiments and various modifications and alterations can be made within the scope of the present invention.

The present invention can be used for a monitoring system, a public cloud system, other cloud computing systems, and others.

What is claimed is:

1. An integrated monitoring system comprising:
    a monitoring target system including a computer for storing one or more activation-source server disk images and monitoring setting information and a server device for operating a processing for each of a plurality of server instances activated as each of a plurality of virtual servers from each of the one or more activation-source server disk images, wherein;
    a monitoring server device for performing a monitor processing for each of the plurality of virtual servers by using a processing by a monitoring agent, which targets at the monitoring target system; and
    a storage device for storing an ID managing program for making the computer execute an information processing of ID management for the monitor processing for each of the plurality of server instances which is each of the plurality of virtual servers,
    in the server device of the monitoring target system, the monitoring agent being operated, the monitoring agent performing a predetermined monitoring processing which targets at the virtual server in accordance with the monitoring setting information for each of the server disk images,
    the monitoring server device performing the monitor processing for the virtual server by using the processing by the monitoring agent,
    the ID managing program includes an ID providing unit, an ID storage unit, and a monitor-data transmitting unit included in the monitoring agent of the server device and a monitor-data receiving unit included in the monitoring server device,
    the ID providing unit performing a processing of providing an ID which is uniquely identifiable to each of the plurality of server instances and a processing of determining whether to newly generate and provide an ID based on a predetermined reference at the activation of the server instance to generate and provide the new ID different from an existing ID if the server instance is newly activated or to provide the same ID as an ID at a previous activation so as to continuously use the ID by using information stored by the ID storage unit if the server instance is restarted,
    the ID storage unit performing a processing of storing information containing the ID provided to each of the server instances into the monitoring setting information for each of the server disk images,
    the monitor-data transmitting unit thereof performing a processing of transmitting monitor data to which information containing the ID provided to the server instance is attached,
    the monitor-data receiving unit performing a processing of retrieving the information containing the ID attached to the received monitor data, and
    the monitoring server device uniquely indentifying all of the plurality of server instances of the monitoring target system by referencing the monitor data and the information containing the ID and performing the monitor processing in accordance with the identification.

2. The integrated monitoring system according to claim 1, wherein the monitoring target system is a public cloud system,
    the server instance which is the virtual server operated by the server device provides a predetermined service processing to a user terminal, and,
    as the monitoring agent operated by the server device, a plurality of monitoring agents each operated so as to correspond to each of the plurality of virtual servers are provided.

3. The integrated monitoring system according to claim 1, wherein the monitoring server device or a terminal device connected to the monitoring server device performs a processing of displaying the information containing the ID provided to each of the server instances based on the monitor data on a screen.

4. The integrated monitoring system according to claim 1, wherein the ID contains first information for uniquely identifying each of the one or more activation-source server disk images and second information for uniquely identifying each of the plurality of server instances activated from the activation-source server disk images.

5. The integrated monitoring system according to claim 1, wherein the ID combines first information for uniquely identifying each of the one or more activation-source server disk images and second information for uniquely identifying each of the plurality of server instances activated from the activation-source server disk images.

6. The integrated monitoring system according to claim 1, wherein the ID managing program includes a network-information confirming program, and,
    at the activation of the server instance, the network-information confirming program performs a processing of confirming network information allocated to the server instance or a server device for operating the server instance to generate and provide a new ID different from an existing ID if the network information has been changed from a period of a previous operation, or to provide the same ID as an ID at the period of the previous operation so as to continuously use the ID if the network information has not been changed therefrom.

* * * * *